(12) United States Patent
Davis

(10) Patent No.: US 12,024,369 B1
(45) Date of Patent: Jul. 2, 2024

(54) CONVEYOR TENSIONING SYSTEM

(71) Applicant: Herzog Railroad Services, Inc., St. Joseph, MO (US)

(72) Inventor: Timothy D. Davis, St. Joseph, MO (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 0 days.

(21) Appl. No.: 18/497,640

(22) Filed: Oct. 30, 2023

Related U.S. Application Data

(60) Provisional application No. 63/488,841, filed on Mar. 7, 2023.

(51) Int. Cl.
*B65G 23/44* (2006.01)

(52) U.S. Cl.
CPC .................... *B65G 23/44* (2013.01)

(58) Field of Classification Search
CPC ....................................................... B65G 23/44
USPC ......................................................... 198/813
See application file for complete search history.

(56) References Cited

U.S. PATENT DOCUMENTS

| | | | | |
|---|---|---|---|---|
| 2,986,267 | A | * | 5/1961 | Carlson .................. B65G 23/44 198/810.04 |
| 3,463,022 | A | | 8/1969 | Miller |
| 4,284,192 | A | * | 8/1981 | Taylor .................... B65G 23/44 198/813 |
| 4,440,097 | A | | 4/1984 | Teske |
| 4,508,213 | A | * | 4/1985 | Kelley .................... B65G 23/44 198/813 |
| 4,893,883 | A | | 1/1990 | Satzler |
| 5,131,528 | A | * | 7/1992 | Bandy, Jr. .............. B65G 23/44 198/813 |
| 5,254,047 | A | | 10/1993 | Anderson |
| 5,334,106 | A | | 8/1994 | Purcell |
| 6,224,172 | B1 | | 5/2001 | Goodwin |
| 6,695,130 | B1 | | 2/2004 | Blaylock et al. |
| 7,770,984 | B2 | | 8/2010 | Schmit et al. |

(Continued)

FOREIGN PATENT DOCUMENTS

| | | |
|---|---|---|
| CN | 105966480 B | 9/2018 |
| CN | 112357472 B | 11/2021 |

(Continued)

*Primary Examiner* — James R Bidwell
(74) *Attorney, Agent, or Firm* — AVEK IP, LLC; Kent R. Erickson

(57) ABSTRACT

A system for controlling the tension in a conveyor assembly includes a conveyor, a hydraulic motor, a pump, a hydraulic fluid reservoir in fluid communication with the pump and in fluid communication with the hydraulic motor, a first valve in fluid communication with the pump and the hydraulic motor, a hydraulic actuator, and an actuator control valve assembly. The conveyor includes a continuous, flexible conveying member rotatably driven around a drive wheel at one end, the drive wheel being connected to the hydraulic motor which receives pressurized hydraulic fluid from a first supply line to drive the motor in a first direction, and from a second supply line to drive the motor in a second direction. The actuator control valve is in fluid communication with the first motor supply line, the hydraulic reservoir, and a first and second port of the actuator.

15 Claims, 6 Drawing Sheets

(56) References Cited

U.S. PATENT DOCUMENTS

| | | | | |
|---|---|---|---|---|
| 7,837,021 | B2* | 11/2010 | Ichikawa | B66B 23/18 |
| | | | | 198/813 |
| 7,914,087 | B2 | 3/2011 | Alfthan | |
| 7,922,266 | B2* | 4/2011 | Dietrich | B62D 55/30 |
| | | | | 305/145 |
| 8,801,904 | B2* | 8/2014 | Miller | C10K 1/10 |
| | | | | 700/270 |
| 2005/0056527 | A1* | 3/2005 | Weigel | B65G 23/44 |
| | | | | 198/813 |
| 2011/0024268 | A1* | 2/2011 | Merten | E21C 29/14 |
| | | | | 198/810.01 |
| 2011/0054749 | A1* | 3/2011 | Merrion | F16D 31/08 |
| | | | | 701/58 |
| 2019/0054749 | A1 | 2/2019 | Kanno et al. | |
| 2021/0094636 | A1 | 4/2021 | Forster et al. | |
| 2022/0275587 | A1 | 9/2022 | Walton et al. | |

FOREIGN PATENT DOCUMENTS

| | | | | |
|---|---|---|---|---|
| CN | 116040211 A * | 5/2023 | | B65G 23/44 |
| DE | 3232322 C2 | 2/1988 | | |
| DE | 19756328 A1 * | 7/1999 | | B65G 23/44 |
| EP | 1647722 B1 | 12/2007 | | |
| GB | 805462 A | 12/1958 | | |
| GB | 2189206 B | 6/1990 | | |
| WO | 2022040739 A1 | 3/2022 | | |

\* cited by examiner

CONVEYOR TENSIONING SYSTEM

CROSS REFERENCE TO RELATED APPLICATIONS

This application claims the benefit of U.S. Provisional Patent Application Ser. No. 63/488,841, entitled Conveyor Tensioner System, filed Mar. 7, 2023, the disclosure of which is incorporated herein in its entirety by reference.

BACKGROUND OF THE INVENTION

Field of the Invention

The invention relates generally to the field of conveyor tensioning systems. More specifically, the invention relates to a system for controlling the tension in conveying members of an infeed conveyor.

Background of the Invention

Conveyors are commonplace in material transport applications and can be used in a wide range of environments, including those in which debris or other hazards may become incidentally lodged between the belt or chain and the rollers or sprockets. In such a scenario, a typical conveyor may become stuck or jammed, causing the belt or chain to stop the transport of material from one end to the other. In this case, there may be a severe increase in the tension of the belt or chain, which may cause a component failure if not properly relieved, or the obstruction itself may cause damage if not promptly removed. This situation may present an operator with one or more of a variety of issues. For example, the operator might want to reverse the direction of the conveyor in order to remove the hazard. However, in many current conveyor systems it is not possible to reverse the direction of the belt or chain while maintaining sufficient tension to allow the drive sprocket to properly drive the conveyor in the reverse direction. Likewise, even in systems where it is possible to reverse direction of the conveyor and maintain tension, this requires additional hardware such as a dedicated reverse drive system or a tensioner system specifically for use in reverse. Therefore, there remains a need for a conveyor system which can maintain tension in the belt or chain independent of the conveyor direction without the use of dedicated hardware for each specific direction.

SUMMARY OF THE INVENTION

Exemplary embodiments are defined by the claims below, not this summary. A high-level overview of various aspects thereof is provided here to introduce a selection of concepts that are further described in the Detailed Description of the Preferred Embodiments section below. This summary is not intended to identify key features or essential features of the claimed subject matter, nor is it intended to be used in isolation to determine the scope of the claimed subject matter. In brief, this disclosure describes a tensioner system for maintaining and modulating the tension in a conveyor belt or chain independent of the direction of the conveyor.

According to an embodiment, a system for controlling the tension in a conveyor assembly is described. The system includes a conveyor, a hydraulic motor, a pump, a hydraulic fluid reservoir in fluid communication with the hydraulic motor and the pump, a first valve in fluid communication with the hydraulic motor and the pump, a hydraulic actuator, and an actuator control valve assembly. The conveyor includes a continuous, flexible conveying member rotatably driven around a drive wheel at a first end, and moving around a guide member at a second end. The hydraulic motor is operatively connected to the drive wheel and is configured to selectively receive pressurized hydraulic fluid from a first motor supply line to drivingly rotate the drive wheel in a first rotational direction and receive pressurized hydraulic fluid from a second motor supply line to drivingly rotate the drive wheel in a second rotational direction. The hydraulic motor is also connected to the hydraulic fluid reservoir via a hydraulic fluid return line for returning hydraulic fluid directed through the first motor supply line and the second motor supply line to the hydraulic fluid reservoir. The first valve selectively connects the first motor supply line and the second motor supply line to a pump discharge line connected to an outlet of the pump or to an auxiliary return line flow connected to the hydraulic fluid reservoir.

The hydraulic actuator is in fluid communication with the actuator control valve assembly, and has a stem connected to a piston within a cylinder. The stem is extendable out of the cylinder to urge the guide member away from the drive wheel and retractable into the cylinder to draw the guide member toward the drive wheel. The actuator control valve assembly is in fluid communication with the first motor supply line via an actuator control valve supply line branching off of the first motor supply line, the hydraulic fluid reservoir through an actuator control valve return line flow connected to the hydraulic fluid return line, a first port of the hydraulic actuator on a first side of the piston opposite the stem through an actuator supply line, and a second port of the hydraulic actuator on a second side of the piston through an actuator return line. The actuator control valve assembly is operable to allow hydraulic fluid to flow from the first motor supply line to the actuator supply line and the first port of the hydraulic actuator or from the first port of the hydraulic actuator and through the actuator return line to the actuator control valve return line when the first valve connects the first motor supply line to the pump discharge line and to prevent hydraulic fluid from flowing from the hydraulic actuator through the first port and the actuator supply line when the first valve connects the second motor supply line to the pump discharge line.

In some embodiments, the actuator control valve comprises a pressure reducing valve in fluid communication with the first motor supply line via the actuator control valve supply line. The pressure reducing valve is also in fluid communication with a pilot-operated check valve via a reduced-pressure supply line. In addition to being in fluid communication with the pressure reducing valve, the check valve is in fluid communication with the first motor supply line via a pilot line, as well as the first port of the hydraulic actuator via the actuator supply line.

In some embodiments, the actuator control valve further comprises a manual relief valve in fluid communication with the actuator supply line and the hydraulic fluid return line.

In some embodiments, the actuators are configured to stop extension or retraction upon reaching one of: a predetermined hydraulic pressure in the actuator and a predetermined tension in the continuous, flexible conveying member.

In some embodiments, the pressure reducing valve is a pressure reducing-reliving valve in further fluid communication with the hydraulic return line via the actuator control valve return line and configured to allow hydraulic fluid to flow from the actuator through the actuator supply line to the actuator control valve return line when the pressure in the actuator exceeds the pressure in the reduced-pressure supply line.

In some embodiments, the continuous, flexible conveying member is a closed-loop chain and the guide member is a substantially D-shaped structure having a flat end and a curved end, the flat end being connected to the stem of the hydraulic actuator, and the curved end being configured to support the closed-loop chain during operation of the conveyor.

BRIEF DESCRIPTION OF THE DRAWINGS

Illustrative embodiments of the present disclosure are described in detail below with reference to the attached drawing figures.

DETAILED DESCRIPTION OF THE PREFERRED EMBODIMENTS

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by ±10%, preferably by ±5% and/or deviations in the form of changes that are insignificant to the function.

Figure 1:
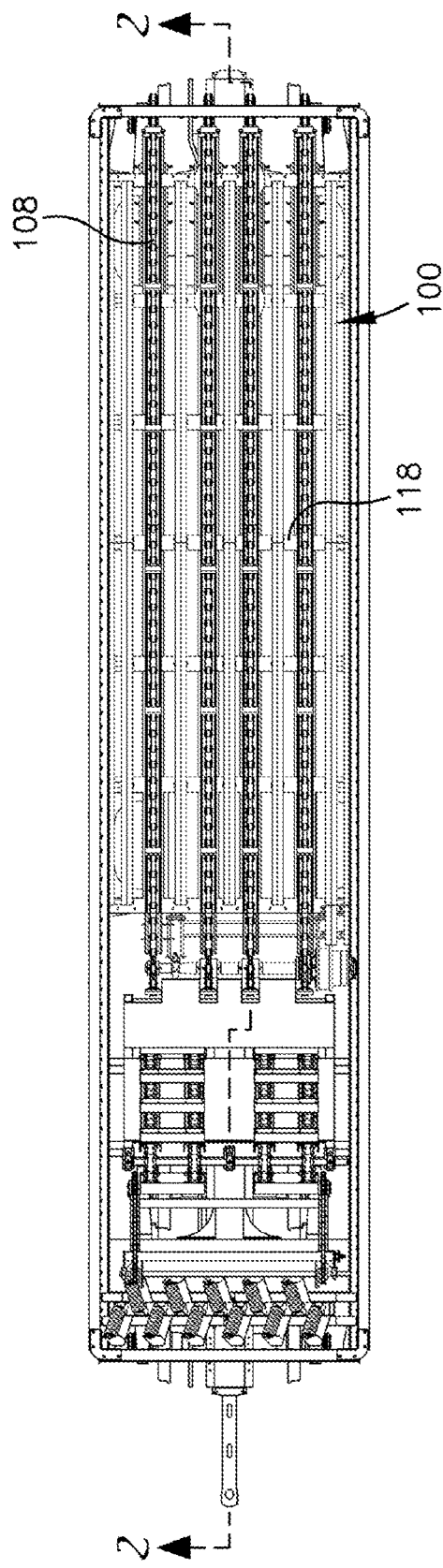
FIG. 1 is a top plan view of an example rail tie distribution car having an infeed conveyor assembly forming part of a rail tie distribution system.
Figure 2:
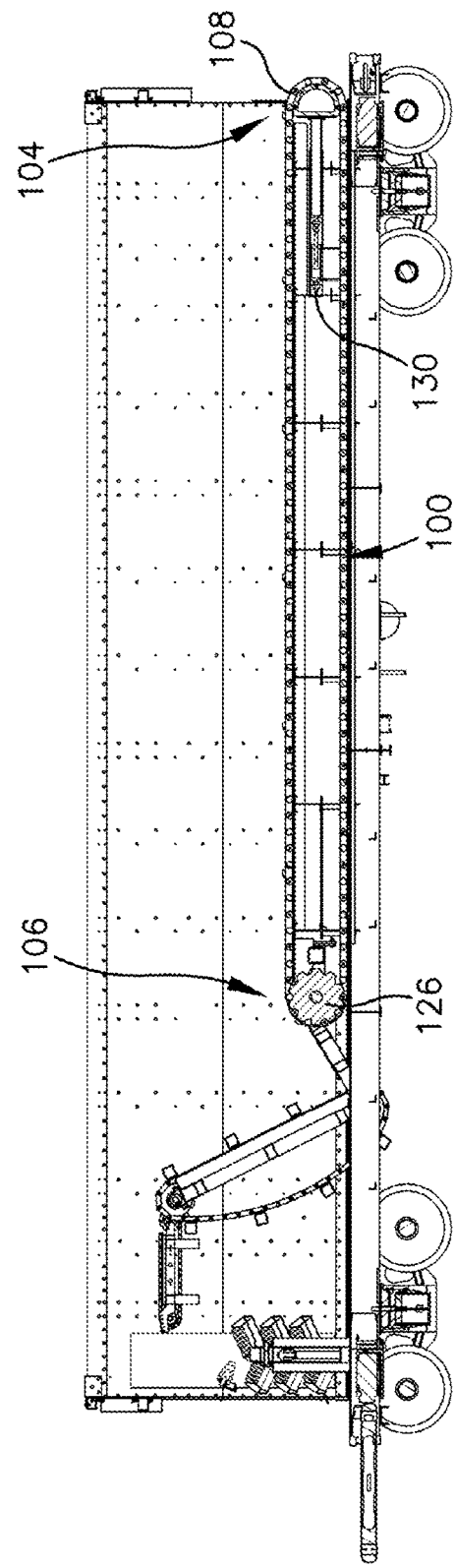
FIG. 2 is a cross-sectional view taken along line 2-2 of FIG. 1.

The conveyor system described herein may be used as part of an assembly line in a factory or similar setting (i.e., in a static environment) or may form part of a vehicle, rail car, or similar mobile apparatus for use in material transport applications. For example, the conveyor may form part of a rail tie distribution system as shown in FIGS. 1 and 2. Additionally, the tensioner system disclosed may form part of a drive assembly for a tracked vehicle, for example an excavator or similar self-propelled vehicle, without departing from the scope of the invention.

Figure 3:
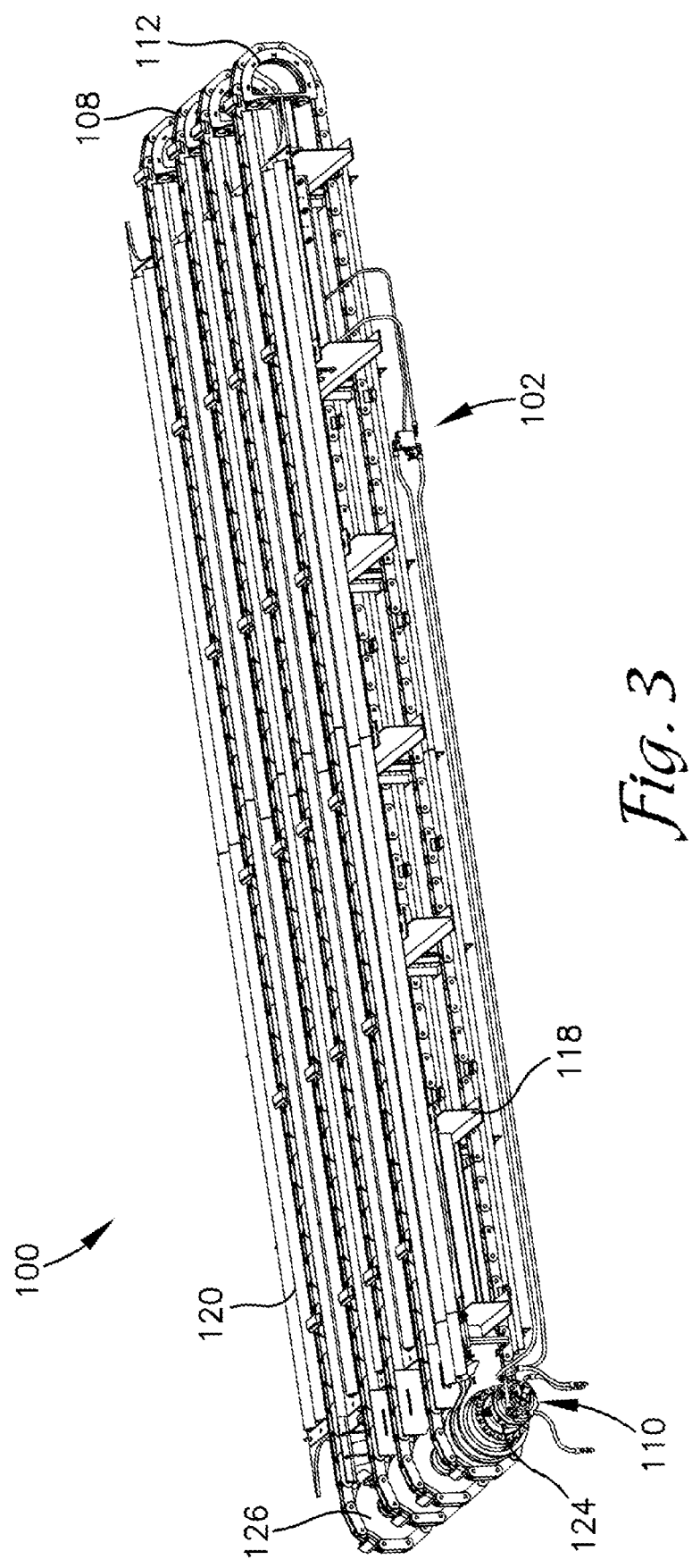
FIG. 3 is a side perspective view of an infeed conveyor assembly having an embodiment of a hydraulic tensioner system.
Figure 4:
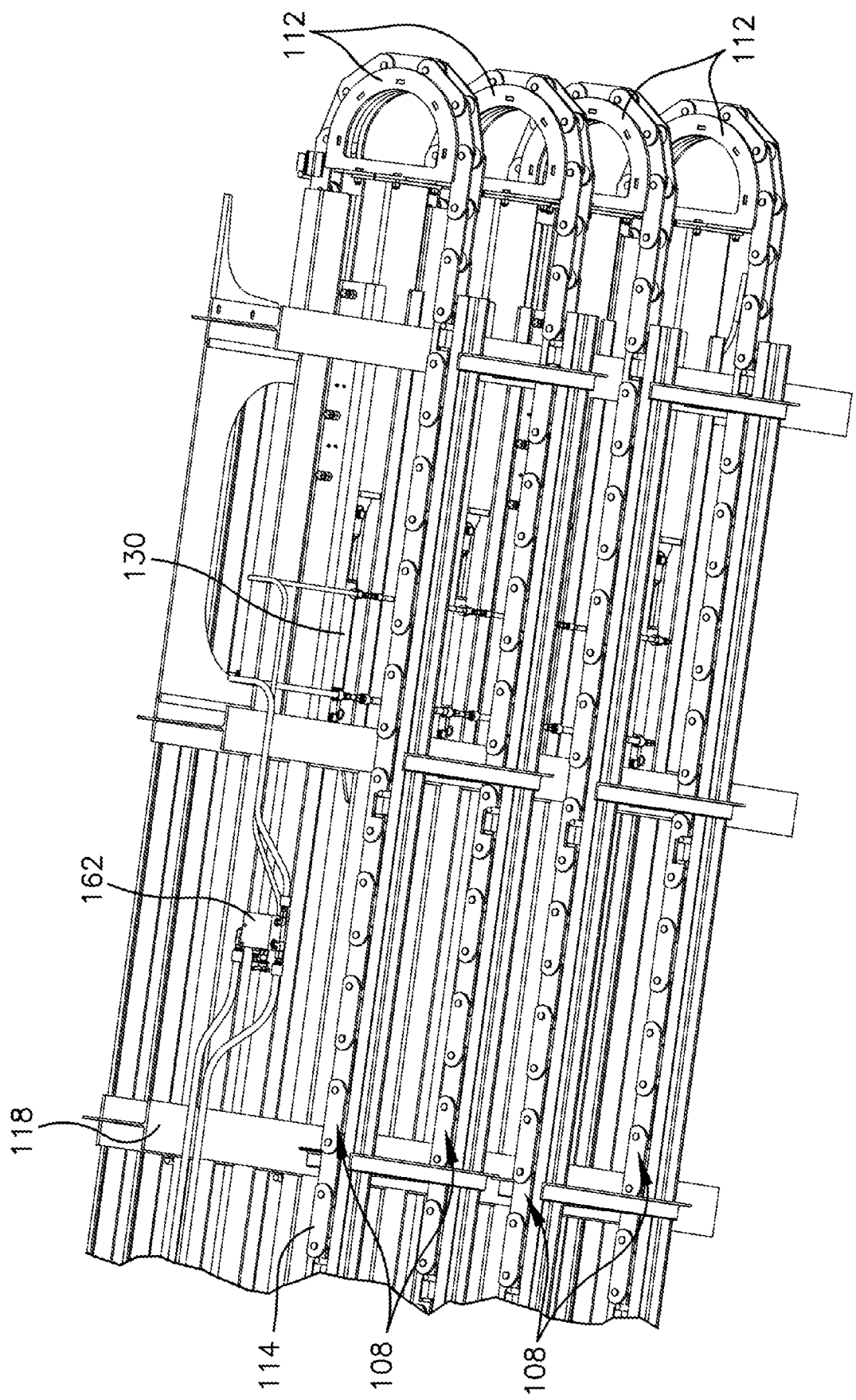
FIG. 4 is a partial bottom perspective view of the infeed conveyor assembly of FIG. 3.
Figure 5:
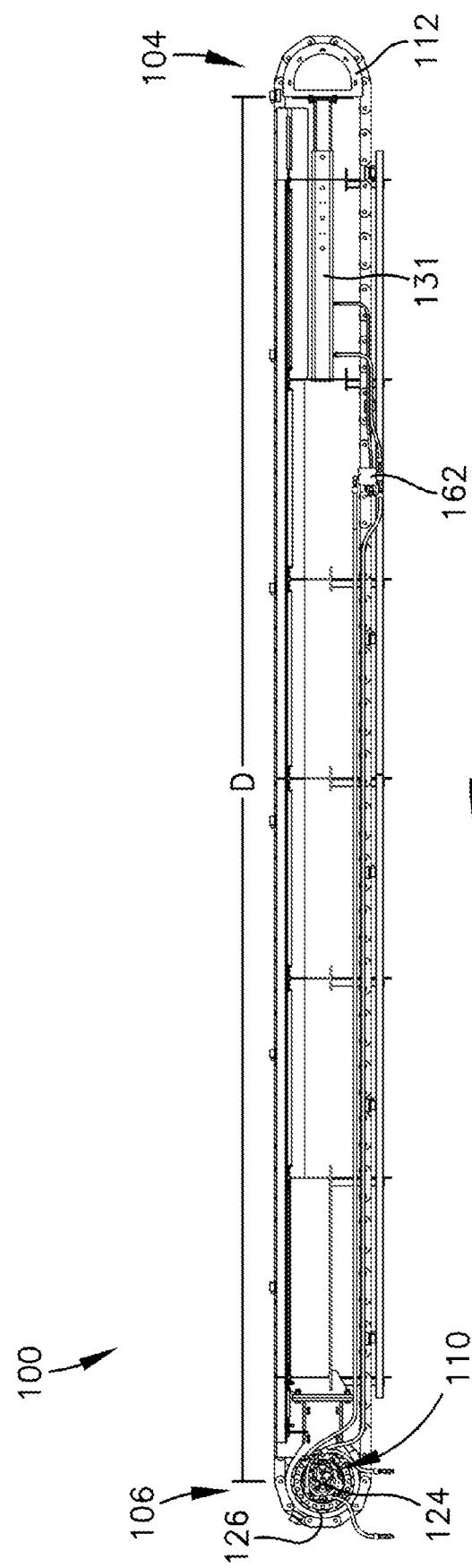
FIG. 5 is a side view of the infeed conveyor assembly of FIG. 3.

With reference to FIGS. 3-5, a conveyor assembly 100 is described, having a hydraulic tensioner system 102 in accordance with an exemplary embodiment. The conveyor assembly 100 may be a continuous belt-type conveyor or, as shown in the above figures, a closed loop chain-type conveyor, configured to transport various materials from an infeed or proximal end 104 to a discharge or distal end 106. Those skilled in the art will understand that the use of the terms "proximal" and "distal" is in reference to the illustrated embodiment in FIGS. 1-5, and is exemplary in nature and not necessarily indicative of every embodiment of the disclosure.

Conveyor assembly 100 includes at least one continuous, flexible conveying member for transporting material. In the illustrated embodiment, the continuous flexible conveying member is in the form of at least one chain 108, and the conveyor assembly 100 preferably includes a plurality of conveyor chains 108, as seen in FIGS. 1-5. Although in the illustrated embodiment the conveyor assembly 100 includes four chains 108, it is foreseen that in other embodiments there may be any number of chains used, depending on the size and/or desired use of the conveyor, without departing from the scope of the invention. Each chain 108 is drivingly connected at the discharge end 106 of the conveyor 100 to a drive assembly 110 and passes through an extendable and retractable guide member or chain guide 112 at the infeed end 104 of the conveyor 100. The chain guide 112 is configured to extend or retract longitudinally in order to maintain the desired tension in the chain during normal operation. The chain 108 may consist of a plurality of interconnected links, with each link 114 being connected by a pin 116. It is foreseen that the tensioning system could be used with other flexible conveying members such as continuous belts or tracks. As used herein a track for a tracked vehicle may be described as a conveyor or conveyor assembly.

In some embodiments, conveyor 100 may include one or more idler sprockets, rollers or guides disposed along the length of the conveyor in order to support the chain 108. In other embodiments, such as that illustrated in FIGS. 3-5, the conveyor assembly 100 includes a frame 118 having a plurality of longitudinal guide rails 120 disposed along an upper surface of the frame, with the guide rails 120 being substantially parallel to the chains 108 and extending along at least a portion of the overall length of the conveyor.

Figure 6:
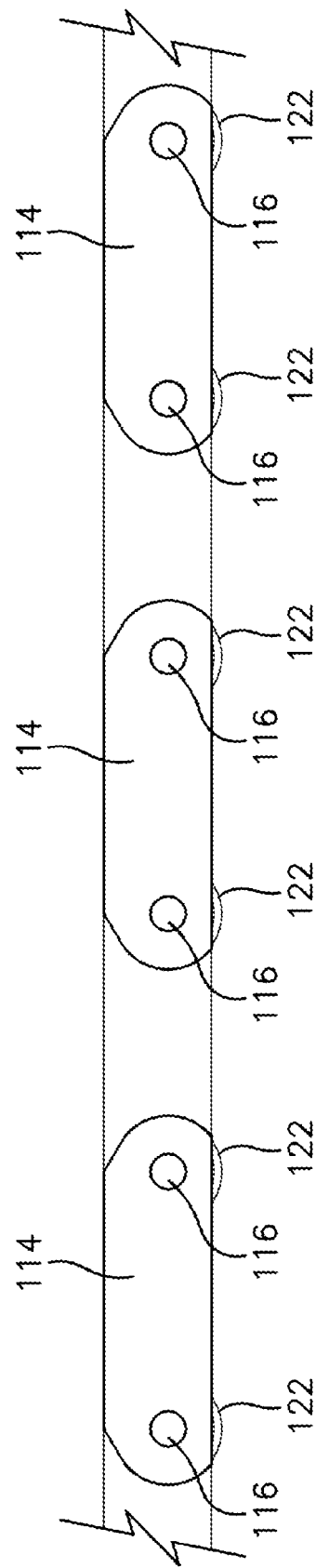
FIG. 6 is an enlarged side view of a partial chain linkage used in the conveyor assembly shown in FIG. 3.

Referring now to FIG. 6, in this embodiment, each chain 108 includes rollers 122 located at each pin 116 along with the interconnecting chain links 114. Each roller 122 is sized such that it extends beyond at least one edge of the chain links 114, and configured to roll along one or more guide rails 120.

The drive assembly 110 includes a bidirectional hydraulic motor 124 drivingly connected to one or more drive sprockets 126, which are configured to move the chains 108 along the length of the conveyor. For exemplary purposes, the chains 108 are driven such that the length or run of each chain 108 on the top side of the conveyor assembly 100 move from the proximal end 104 to the distal end 106 during normal operation which as used herein will be referred to as a forward direction or forward advancement of the chains 108. In the embodiment shown, advancement of the chains 108 in the forward direction advances rail ties positioned thereon to a rail tie singulating system. It is foreseen that in other embodiments this relationship may be inverse. The drive assembly may also include a gearbox 127 (shown schematically in FIG. 7) such as a planetary drive system to transmit power from the hydraulic motor 124 to the drive sprocket(s) 126. The hydraulic motor 124 is in fluid communication with a hydraulic fluid reservoir 128, and receives pressurized hydraulic fluid from said reservoir in order to drive the gearbox and/or drive sprockets 126.

The infeed end 106 of the conveyor assembly 100 includes the chain guide 112, which is configured to maintain the upper and lower lengths or runs of the chain 108 in relative alignment. The chain guide 112 is configured to be longitudinally moveable, such that increasing the distance D (See FIG. 5) between the axis of rotation of the drive sprockets 126 and the chain guide 112 results in an increased tension in the chain 108, and decreasing the distance D therebetween decreases the tension in the chain 108. In the illustrated embodiment, the chain guide 112 is substantially D-shaped, wherein the chain 108 is directed around the curved side of the guide 112, while the flat side of the guide is coupled to one or more linear actuators 130 (shown schematically in FIG. 7) each mounted in a telescoping tube assembly 131 connected between the conveyor frame 118 and the chain guide 112. The linear actuators 130 form part of the hydraulic tensioner system 102 which varies the tension in the chain 108 by moving the linear actuators 130 as is described in further detail below. The linear actuators 130 may take the form of hydraulic cylinders having a stem connected to a piston inside the cylinder, although other hydraulic actuators now known or later developed may be implemented without departing from the scope of the invention.

In some applications in which the tensioning system is used, the conveyor may be formed from belts driven by drive rollers instead of drive sprockets and as used herein the term drive wheel includes both drive rollers and drive sprockets. The chain guide may be formed as a sprocket or roller depending on the application or construction of the continuous conveying member used and may be referred to as a guide member. It is foreseen that a roller or sprocket used as the guide member may be driven or may rotate freely.

Figure 7:
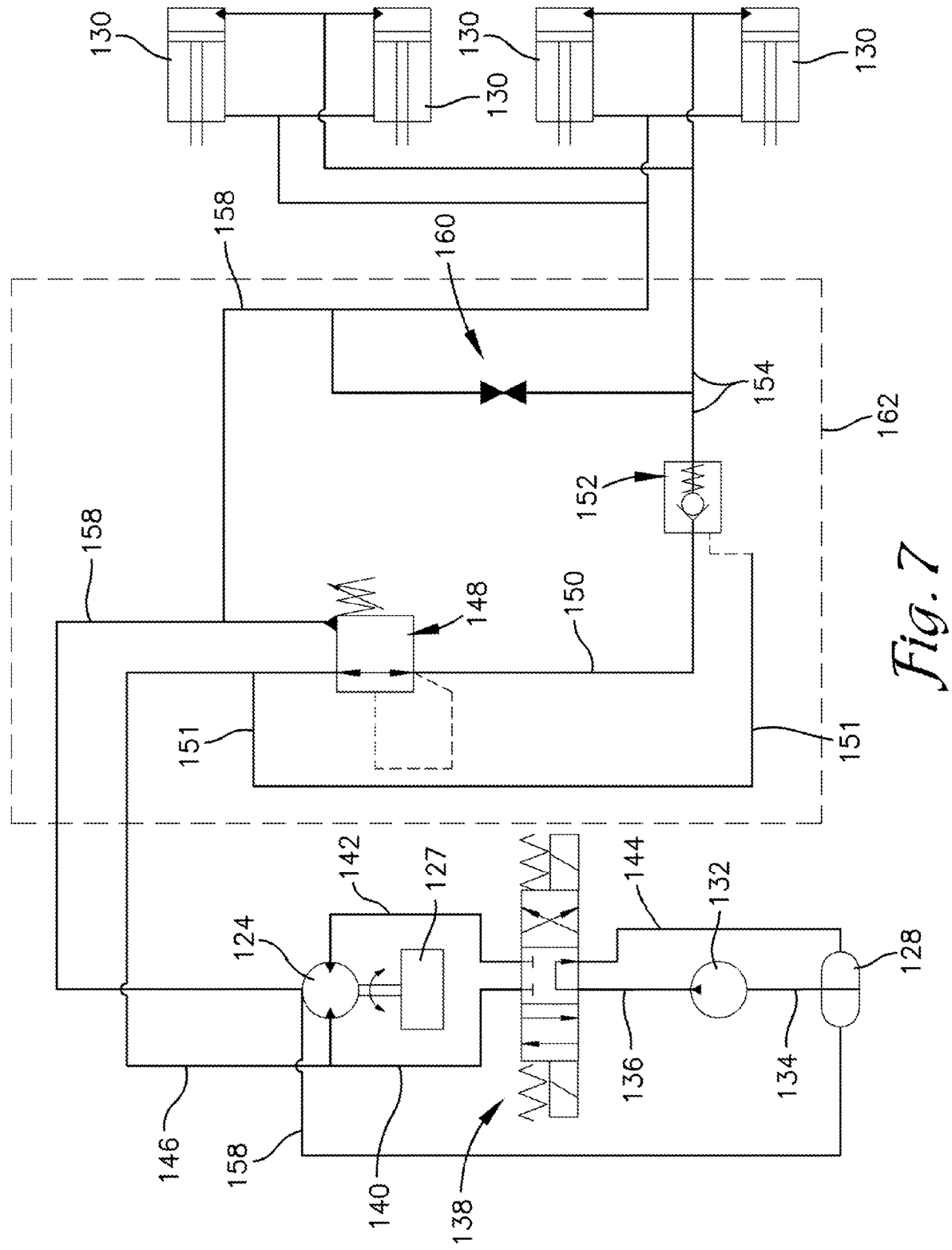
FIG. 7 is a hydraulic schematic of an embodiment of a conveyor tensioner system.

Referring now to FIG. 7, a hydraulic schematic of the conveyor tensioner system 102 is shown. Compared to existing solutions, the tensioner system 102 does not require an additional or separate hydraulic pump to supply pressurized hydraulic fluid to the actuators 130 or other tensioning means. Instead, the tensioner system 102 uses the same hydraulic pressure which drives the hydraulic motor 124 to supply the requisite pressure to operate the tensioning means, such as the linear actuators 130 connected to the chain guide 112. The hydraulic tensioner system 102 includes the hydraulic fluid reservoir 128 in fluid communication with a pump 132 via a pump supply line 134. The pump 132 builds pressure in the hydraulic system in order to both drive the hydraulic motor 124 and operate the tensioner system 102. Pressurized hydraulic fluid from the pump 132 flows through a pressurized hydraulic line 136 into a motor control valve 138 which controls the flow of pressurized hydraulic fluid to the motor 124. In the illustrated embodiment, the valve 138 is a three-position, 4-way, spring-centered solenoid valve, which is configured to provide pressurized hydraulic fluid based on the operating state of the conveyor, such as being driven in a forward direction, a reverse direction, or stopped entirely. For applications wherein the conveyor is driven forwards, the valve 138 opens to allow pressurized hydraulic fluid to flow through a first motor supply line 140 into the motor 124. Likewise, in applications wherein the motor is driven in reverse, the valve 138 opens to allow pressurized hydraulic fluid to flow through a second motor supply line 142 into the motor 124. If the motor 124 is not driven and/or is stopped, then the valve opens to return the pressurized hydraulic fluid to the reservoir 128 via an auxiliary return line 144. The bidirectional hydraulic motor 124 may be, as in the illustrated embodiment, connected to the gearbox 127 which is drivingly connected to the one or more drive sprockets 126 through a transmission (not shown).

During normal operation in which the motor 124 is driven forwards, the fluid in the first motor supply line 140 is pressurized at a first pressure. Branching off of the first motor supply line 140 is a high-pressure supply line 146, which carries hydraulic fluid at the same first pressure as the first motor supply line 140. The high pressure supply line 146 is connected to a pressure reducing valve 148. If the first pressure in the high-pressure supply line 146 exceeds a predetermined threshold pressure, the valve 148 reduces the first pressure to a second pressure, which is then output via a reduced-pressure supply line 150 to a check valve 152. The predetermined threshold pressure may vary depending on the application, although in some embodiments it may be approximately 800 psi. The second pressure may be substantially equal to the predetermined threshold pressure.

A pilot line 151 branching off of the high-pressure supply line 146 is connected to a pilot port of check valve 152, which may be a spring-operated check valve which opens or closes upon reaching a predetermined pilot pressure or pressure ratio. Upon receiving hydraulic fluid at the first pressure, wherein the first hydraulic pressure is sufficient to satisfy the pilot pressure requirements, the check valve 152 opens to allow hydraulic fluid at the second (reduced) pressure to flow through the valve 152 freely and to the linear actuator(s) 130 via a linear actuator supply line 154. The linear actuators 130 may then move in response to this pressure, consequently causing the chain guide 112 to extend away from the drive sprockets 126 on the infeed or proximal end 104 of the conveyor and increase the tension in the chains 108 to the desired level.

In some embodiments, the linear actuators 130 may be configured to stop extending automatically upon the chains 108 reaching a predetermined threshold tension, or upon reaching a predetermined threshold hydraulic pressure. This may be achieved passively, or in some embodiments this may be achieved actively through the use of a control system or feedback loop 156 (not shown). The control system 156 may include one or more sensors for determining a characteristic of the conveyor system, such as the tension in the chain, the extension of the actuators 130, or the hydraulic pressure in the actuators 130. When the characteristic reaches a predetermined threshold, the hydraulic control system 156 may then stop the actuators 130 at the desired location.

In the event that debris or an obstruction which severely restricts or prevents movement of the chains 108 enters the conveyor, tension in the chain may substantially increase, resulting in a subsequent increase in hydraulic pressure in the actuators and/or the actuator supply line 154. In such cases, the pressure in the actuator supply line 154 may exceed the second pressure in the reduced pressure supply line 150, such that hydraulic fluid may flow from the actuators 130 through the actuator supply line 154 and check valve 152. The high-pressure hydraulic fluid from the actuators 130 then flows back through the reduced pressure supply line 150 into valve 148. When this occurs, and this increased pressure exceeds the predetermined threshold pressure of the first valve, a relief port on valve 148 opens to a primary return line 158, which is in fluid communication with the hydraulic fluid reservoir 128, and hydraulic fluid is returned to the reservoir 128. Once sufficient pressure has been relieved and hydraulic fluid has been returned to reservoir 128, the relief port may close.

Alternatively, in the event that debris or an obstruction causes a significant increase in hydraulic pressure in the actuators 130 and the actuator supply line 154, the check valve 152 may close. The check valve 152 may close when the increased pressure in the actuator supply line 154 exceeds a predetermined threshold pressure or a predetermined ratio of the pressure in the actuator supply line 154 to the pressure in the reduced pressure supply line 150. In some embodiments, the threshold ratio is such that the pressure in the actuator supply line 154 is a multiple of the pressure in the reduced pressure supply line 150, for example, 3:1. In other embodiments, various pressure ratios may be used, depending on application, without departing from the scope of the disclosure.

In some embodiments, the primary return line 158 may be directly connected to the linear actuators 130, allowing additional hydraulic fluid to flow from the actuators 130 into the fluid reservoir 128. The hydraulic motor 124 is also connected to the primary return line 158, allowing any excess hydraulic fluid from the motor 124 to flow back into the reservoir 128. In some embodiments, including the embodiment shown in FIG. 7, the tensioner system 102 also includes a manual relief valve 160, such as a ball valve or needle valve, which is connected to the linear actuator supply line 154 and the primary return line 158. This relief valve 160 may be opened during maintenance, for example, to allow any remaining hydraulic fluid to be returned to the reservoir 128, although during normal operation the relief valve 160 remains closed.

In some applications, for example when removing debris or an obstruction from the conveyor assembly, it may be necessary for an operator to reverse the direction of the conveyor 100 (and by association, motor 124). When the motor 124 is driven in reverse, the motor control valve 138 is configured to provide pressurized hydraulic fluid to the motor 124 via the second motor supply line 142, and the first hydraulic pressure in the first motor supply line is substantially reduced. In some embodiments, the first hydraulic pressure in the first motor supply line 140 (and subsequently the pressure in the high pressure supply line 146) may be reduced to zero or a negligibly low value. As a result of the decrease in the pilot pressure, the check valve 152 closes, thereby preventing any flow from the linear actuators 130 or actuator supply line 154 back to the fluid reservoir 128. Because the hydraulic fluid (and therefore the hydraulic pressure) cannot leave the actuators, the actuators will remain at their previous length, thereby maintaining the tension in the chain 108 that was present before the conveyor 100 was reversed.

In some embodiments, the pressure-reducing relieving valve 148, the check valve 152, and the manual relief valve 160 may be separate and/or individually packaged. In other embodiments, such as the illustrated embodiment, these three valves may be combined and/or held in a single control valve housing 162. Combining each of the three valves 148, 152, and 160 into a single housing may provide packaging benefits and/or reduce the total number of parts required in the tensioner system 102.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for controlling tension in a conveyor assembly, the system comprising:
   a conveyor including a continuous, flexible conveying member rotatably driven around a drive wheel at a first end and moving around a guide member at a second end;
   a hydraulic motor operatively connected to the drive wheel and configured to selectively receive pressurized hydraulic fluid from a first motor supply line to drivingly rotate the drive wheel in a first rotational direction and from a second motor supply line to drivingly rotate the drive wheel in a second rotational direction;
   a hydraulic actuator having a stem connected to a piston within a cylinder, the stem of the hydraulic actuator extendable out of the cylinder to urge the guide member away from the drive wheel and retractable into the cylinder to draw the guide member toward the drive wheel;
   a pump;
   a hydraulic fluid reservoir having hydraulic fluid therein and in fluid communication with the pump through a pump supply line;
   a first valve selectively connecting the first motor supply line and the second motor supply line to a pump discharge line connected to an outlet of the pump or to an auxiliary return line flow connected to the hydraulic fluid reservoir;
   a hydraulic fluid return line connected between the hydraulic motor and the hydraulic fluid reservoir for returning hydraulic fluid directed through the first motor supply line and the second motor supply line to the hydraulic fluid reservoir; and
   an actuator control valve assembly:
      in fluid communication with the first motor supply line through an actuator control valve supply line branching off of the first motor supply line;
      in fluid communication with the hydraulic fluid reservoir through an actuator control valve return line flow connected to the hydraulic fluid return line;
      in fluid communication with a first port of the hydraulic actuator on a first side of the piston opposite the stem through an actuator supply line; and
      in fluid communication with a second port of the hydraulic actuator on a second side of the piston through an actuator return line;
   wherein the actuator control valve assembly is operable to allow hydraulic fluid to flow from the first motor supply line to the actuator supply line and the first port of the hydraulic actuator or from the first port of the hydraulic actuator and through the actuator return line to the actuator control valve return line when the first valve connects the first motor supply line to the pump discharge line and to prevent hydraulic fluid from flowing from the hydraulic actuator through the first port and the actuator supply line when the first valve connects the second motor supply line to the pump discharge line.

2. The system according to claim 1, wherein the actuator control valve assembly comprises:
   a pressure reducing valve in fluid communication with the first motor supply line via the actuator control valve supply line; and
   a pilot-operated check valve in fluid communication with the pressure reducing valve via a reduced-pressure supply line, the first motor supply line via a pilot line, and the first port of the hydraulic actuator via the actuator supply line.

3. The system according to claim 2, wherein the actuator control valve further comprises a manual relief valve in fluid communication with the actuator supply line and the hydraulic fluid return line.

4. The system according to claim 1, wherein the actuators are configured to stop extension or retraction upon reaching one of: a predetermined hydraulic pressure in the actuator and a predetermined tension in the continuous, flexible conveying member.

5. The system according to claim 2, wherein the pressure reducing valve is a pressure-reducing relieving valve, the valve being in further fluid communication with the hydraulic return line via the actuator control valve return line and configured to allow hydraulic fluid to flow from the actuator through the actuator supply line to the actuator control valve return line when the pressure in the actuator exceeds the pressure in the reduced-pressure supply line.

6. The system according to claim 1, wherein the continuous, flexible conveying member is a closed-loop chain and the guide member is a substantially D-shaped structure having a flat end and a curved end, the flat end being connected to the stem of the hydraulic actuator, and the curved end being configured to support the closed-loop chain during operation of the conveyor.

7. A system for controlling tension in a conveyor assembly, the system comprising:
   a conveyor including a continuous, flexible conveying member rotatably driven around a drive wheel at a first end and moving around a guide member at second end;
   a hydraulic motor operatively connected to the drive wheel and configured to selectively receive pressurized hydraulic fluid from a first motor supply line to drivingly rotate the drive wheel in a first rotational direction and from a second motor supply line to drivingly rotate the drive wheel in a second rotational direction;
   a hydraulic actuator extendable to urge the conveying member guide away from the drive wheel and retractable to draw the guide member toward the drive wheel;
   a pump;
   a hydraulic fluid reservoir having hydraulic fluid therein and in fluid communication with the pump through a pump supply line;
   a first valve selectively connecting the first motor supply line and the second motor supply line to a pump discharge line connected to an outlet of the pump or to an auxiliary return line flow connected to the hydraulic fluid reservoir;
   a pressure reducing valve in fluid communication with the first motor supply line through a high-pressure supply line branching off of the first motor supply line and in fluid communication with the hydraulic fluid reservoir through a fluid return line; wherein the pressure of hydraulic fluid flowing out of the pressure reducing valve in a reduced pressure supply line is maintained at or below a set pressure; and
   a check valve in fluid communication with the pressure reducing valve through the reduced pressure supply line and in fluid communication with the hydraulic actuator through an actuator supply line; a pilot line branching off of the high pressure supply line is connected to the check valve and operable to keep the check valve open for hydraulic fluid to flow through the check valve from the reduced pressure supply line to the actuator supply line when the pressure in the reduced pressure supply line is greater than the pressure in the actuator supply line and the check valve is configured to allow hydraulic fluid to flow out of the hydraulic actuator through the actuator supply line and through the check valve back through the reduced pressure supply line to the pressure reducing valve and to the hydraulic fluid reservoir if the pressure in the actuator supply line is below a multiple of the pressure in the high pressure supply line and wherein the check valve closes to prevent hydraulic fluid from flowing out of the hydraulic actuator through the actuator supply line if the pressure in the actuator supply line exceeds the multiple of the pressure in the pilot line to prevent further retraction of the hydraulic actuator which occurs when the first valve is operated to direct hydraulic fluid through the second motor supply line and not through the first motor supply line.

8. The system according to claim 7, wherein the pressure reducing valve is configured to allow hydraulic fluid to flow to the hydraulic fluid reservoir via the return line when the pressure in the actuator exceeds the pressure in the reduced-pressure supply line.

9. The system according to claim 7, wherein the pressure reducing valve and the check valve are contained within a common housing.

10. The system according to claim 7, further comprising a manual relief valve in fluid communication with the actuator supply line and the hydraulic fluid reservoir.

11. The system according to claim 7, wherein the continuous, flexible conveying member is a closed-loop chain and the guide member is a substantially D-shaped structure having a flat end connected to the hydraulic actuator and a curved end configured to support the closed-loop chain during operation of the conveyor.

12. The system according to claim 11, wherein the conveyor further comprises at least one chain guide rail extending at least partially between the guide member and the drive wheel, and the closed-loop chain is formed from a plurality of interconnected links, each link having a pair of opposing straight edges connected at a first curved end and a second curved end and being connected to an adjacent link by a pin coaxially connected to a roller, the roller being sized such that it extends beyond at least one of the opposing straight edges of the link.

13. A system for controlling tension in a conveyor assembly, the system comprising:
   a conveyor having a driven end, a guide end, and at least one continuous, flexible conveying member extending around the driven end and the guide end;
   a hydraulic motor connected to the driven end and configured to selectively receive pressurized fluid from a first motor supply line and a second motor supply line;
   a hydraulic actuator, the actuator being selectively extendable to move the guide end of the conveyor away from the driven end of the conveyor and selectively retractable to move guide end of the conveyor towards the driven end of the conveyor;
   a pump;

a hydraulic fluid reservoir containing hydraulic fluid therein and in fluid communication with the pump through a pump supply line;

a first valve selectively connecting the first motor supply line and the second motor supply line to at least one of: the pump via a pump discharge line and the hydraulic fluid reservoir via an auxiliary return line; and an actuator control valve assembly in fluid communication with:
- the first motor supply line through an actuator control valve supply line;
- the hydraulic fluid reservoir through an actuator control valve return line connected to the hydraulic fluid return line;
- a first port of the hydraulic actuator through an actuator supply line; and
- a second port of the hydraulic actuator through an actuator return line.

14. The system according to claim 13, wherein the actuator control valve assembly is configured to:

allow hydraulic fluid to flow from the first motor supply line to the actuator supply line and the first port of the hydraulic actuator or from the first port of the hydraulic actuator and through the actuator return line to the actuator control valve return line when the first valve connects the first motor supply line to the pump discharge line; and prevent hydraulic fluid from flowing from the hydraulic actuator through the first port and the actuator supply line when the first valve connects the second motor supply line to the pump discharge line.

15. The system according to claim 13, wherein the actuator control valve further comprises:

a pressure reducing valve in fluid communication with the first motor supply line via the actuator control valve supply; and a pilot-operated check valve in fluid communication with the pressure reducing valve via a reduced-pressure supply line, the first motor supply line via a pilot line, and the first port of the hydraulic actuator via the actuator supply line.

* * * * *